Sept. 9, 1958　　　C. O. KREUTZER　　2,850,833
ELECTRO-FISHING METHOD AND APPARATUS
INVOLVING REDUCED CURRENT
Filed Oct. 19, 1956　　　　　　　　3 Sheets-Sheet 1

INVENTOR.
CONRADIN OTTO KREUTZER
BY Arthur J. Robert
ATTORNEY

Sept. 9, 1958  C. O. KREUTZER  2,850,833
ELECTRO-FISHING METHOD AND APPARATUS
INVOLVING REDUCED CURRENT
Filed Oct. 19, 1956  3 Sheets-Sheet 2

*INVENTOR.*
CONRADIN OTTO KREUTZER

BY Arthur Robert

ATTORNEY

Sept. 9, 1958 C. O. KREUTZER 2,850,833
ELECTRO-FISHING METHOD AND APPARATUS
INVOLVING REDUCED CURRENT
Filed Oct. 19, 1956 3 Sheets-Sheet 3

*INVENTOR.*
CONRADIN OTTO KREUTZER
BY Arthur J Robert
ATTORNEY

United States Patent Office 2,850,833
Patented Sept. 9, 1958

2,850,833

ELECTRO-FISHING METHOD AND APPARATUS INVOLVING REDUCED CURRENT

Conradin Otto Kreutzer, Meersburg (Bodensee), Germany, assignor to Fish Products Company, Lewes, Del., a corporation of Delaware Application October 19, 1956, Serial No. 617,185

11 Claims. (Cl. 43—17.1)

My copending U. S. application, Serial Number 468,098, Patent No. 2,792,659, issued May 21, 1957, makes known: that, when a succession of spaced D. C. electro-fishing impulses is discharged through sea water between submerged anode and cathode electrodes, three electrified zones are created around the anode, namely an inner narcosis zone, a surrounding taxis zone and an outlying scaring zone; that the movement of each different size and specie of fish is controlled by a different impulse repetition rate which, generally speaking, is fast for small fish and slow for large fish; and that the use of the appropriate "controlled-movement" rate for a given size and specie of fish decreases the size of the narcosis zone and increases the size of the taxis zones for that particular fish.

Another way of increasing the size of the taxis zone is to increase the peak voltage of the electro-fishing impulses. But an increase of this character also increases the size of the narcosis zone, which is undesirable, because the narcosis area over which immobilized fish may be scattered is then made larger and their collection more difficult.

The principal object of this invention is to provide an improved method for electro-fishing in sea water in which the taxis zone can be initially expanded outwardly to embrace a larger number of fish and then quickly retracted inwardly so as to converge around the anode along with the fish.

Another important object is to reduce the size of the narcosis area immediately after the fishing operation is started in order to minimize the number of fish which may be immobilized in that area and thereby correspondingly reduce the possibility of a large number of fish being scattered over an objectionably large collection area.

Another important object of this invention is to provide a novel, practical and effective apparatus for practicing this method.

Briefly stated my invention resides in discharging electro-fishing impulses of high peak voltage at the beginning of the electro-fishing operation and thereafter discharging an electro-fishing current of relatively reduced voltage in order to reduce the size of the narcosis area as the fish swim toward that area and toward the anode. With a high peak voltage at the beginning of the operation, a large taxis zone is established so that all the fish within that larger zone are compelled to swim toward the attractive electrode. However, by reducing the voltage of the electro-fishing current as the fish converge toward the anode, the boundaries of the taxis zone are made to converge in a corresponding manner. At the same time, the narcosis zone shrinks around the attractive electrode and, in that way, the area in which fish are either killed or paralyzed is minimized.

My invention can be practiced with a variety of different forms of apparatus. In one embodiment I overspeed the voltage generator very substantially so that at the instant the electro-fishing operation begins, the generator will overload and the overload will cause it progressively to decrease its speed quickly and thereby correspondingly decrease its voltage so as to discharge impulses of progressively reduced peak voltage.

In another embodiment the field circuit of the voltage generator is progressively reduced to bring about a progressive reduction in the impulse voltage. In still another embodiment, a saturable core reactor is arranged in the impulse circuit to operate at the beginning of the electro fishing operation in a saturated condition so that it has little or no inductive effect on the impulse.

However, as fishing progresses, the reactor current is progressively reduced so that the reactor becomes effective progressively to introduce inductance into the impulse circuit and thereby correspondingly reduce the voltage amplitude of the fishing impulses.

In further accordance with my invention, the generator circuit is switched from direct current of the impulse type to relatively low voltage direct current of the sustained type either after the impulse current voltage has been reduced or in place of it. By "relatively low voltage direct current of the sustained type", I mean a relatively steady continuously flowing low voltage direct current capable of holding the converged fish without harming them. This can be done simply by disconnecting the circuit means, which open and close the impulse discharging circuit for impulse discharging purposes, and by connecting the fishing electrode directly across the direct current source.

The invention is illustrated in the accompanying drawings wherein.

In carrying out my improved method, of course, the initial steps prior to the electro-fishing phase of the method will consist of sighting a school of fish and establishing their specie and size in order to determine the most desirable impulse rate to be used in catching them, and immersing the pair of electrodes 1 and 2 in the sea water with the attractive electrode 1 positioned in the most advantageous position to control the largest number of fish.

Figure 1:
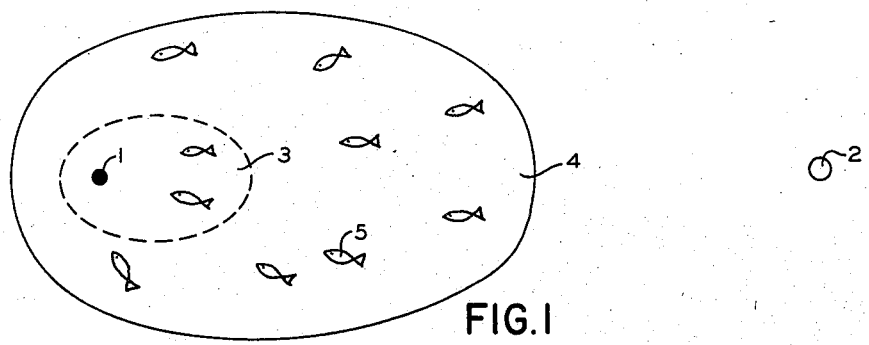
Fig. 1 is a schematic plan view of the beginning of an electro fishing operation.
Figure 2:
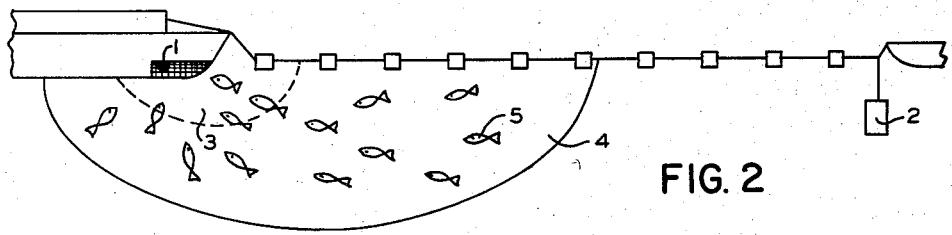
Figs. 2 to 4 are schematic views in elevation illustrating successive stages of an electro-fishing operation carried out in accordance with my improved method.

Figs. 1 and 2 illustrate the conditions prevailing at the beginning of an electro-fishing operation in which periodic electrical impulses of a desirable shape, rate and voltage are discharged between a pair of spaced electrodes 1 and 2 immersed in suitable fishing waters. Assuming that the electrode 1 is the attractive electrode, an inner narcosis zone 3 bounded by the dotted line and an outer taxis zone 4 bounded by the solid line are created around electrode 1. The fish 5 within the taxis zone 4 are induced to move toward the electrode 1 and any fish within the narcosis zone 3 are immobilized. As the fish 5, initially in the taxis zone 4 swim toward the attractive electrode 1, they will enter the narcosis zone 3, if the narcosis zone 3 remains the same size, and be affected accordingly.

In accordance with my improved method, I initially generate and discharge periodic impulses of a suitable shape and rate and having a high (and preferably an abnormally high) peak voltage thereby providing a large taxis zone 4, as shown in Figs. 1 and 2, in order to catch the largest number of fish. As a result, a corresponding larger narcosis zone 3 will also be created, but the effects of this zone can be substantially disregarded at the beginning of electro-fishing as only a comparatively small number of fish will be in this zone at this time.

After this very large taxis zone 4 has been initially created, the fish therein will swim very rapidly toward the attractive electrode 1. In order to keep these fish 5 from immediately entering the narcosis zone 3, the peak voltage of the electro-fishing impulses is progressively reduced at a suitable controlled rate which naturally causes the outermost boundaries of the taxis zone 4 and the narcosis zone 3 to recede at the same rate. With proper control the majority of the fish should remain in the receding taxis zone 4 and never reach the receding narcosis zone 3. As the narcosis zone 3 recedes, it becomes small enough for practical fish collection purposes; hence no great harm is done even if some of the fish reach it during the latter half of the period in which the fish converge upon the attractive electrode.

Figure 3:
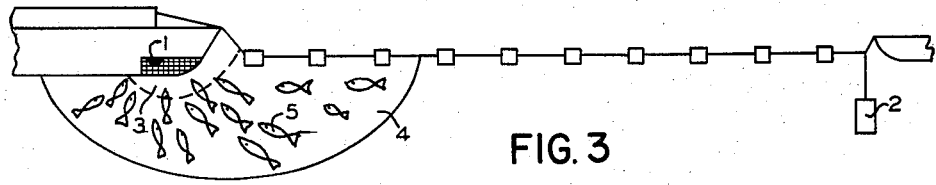

Fig. 3 illustrates an intermediate phase of this method of electro-fishing and shows that the taxis zone 4 has been reduced with a corresponding reduction in the narcosis zone 3, the fish 5 having become massed closer together in the taxis zone.

Figure 4:
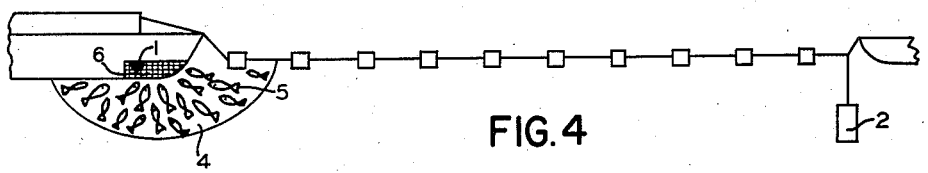

This progressive reduction of the peak voltage values of the impulses is carried out until a desired minimum value is reached where, as shown in Fig. 4, the taxis zone 4 has been reduced to a relatively small size with the fish 5 being very closely massed within it. At this stage, if the narcosis zone 3 is not out of reach of the fish, it has at least been reduced to a size so small that its effects can be disregarded. When the fish are in a position such as shown in Fig. 4 the impulses can be continued at the desired minimum peak voltage values until the fish have been removed from the water by a suitable means, or in accordance with another feature of my invention, the impulse current can be shifted to a sustained direct current of a low value which is enough to hold the fish 5 massed about the electrode 1 until they can be removed from the water.

The narcosis zone may be reduced to a size so small that it lies entirely within the confines of a fence or barrier 6, which is mounted to extend around the attractive electrode 1.

The circuits of Figs. 5, 6, 8 and 10 each includes: a power supply means initially operative to energize the electrodes with an electro-fishing current of desired voltage; and control means rendering the power supply means subsequently operative to energize the electrodes at a lower voltage.

Figure 5:
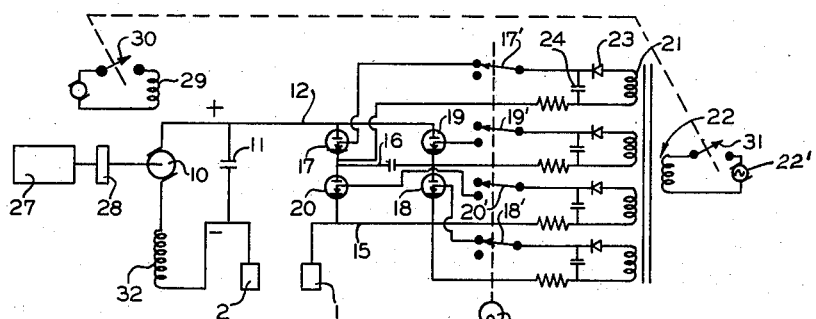
Fig. 5 is a diagram of an embodiment of an apparatus for practicing my improved method.

The power supply means of Fig. 5 includes: a D. C. generator 10 working continuously to charge a capacitor 11 of large capacity to provide an electrical energy source, capable of instantaneously supplying a large amount of direct current, connected on the positive side to a bus 12 and on the negative side through a pair of fishing electrodes 1 and 2 to a bus 15; two branch circuits, each branch adapted to be alternately energized to charge a "pulsing" or "voltage doubler" capacitor 16 in an opposite direction to the charge previously impressed on said capacitor 16 by the other branch, each branch containing a different pair of normally open arc-type tubes or ignitrons with said voltage doubler capacitor 16 common to both branches, one branch circuit extending from bus 12 successively through ignitron 17, common capacitor 16 and ignitron 18 to bus 15 and to other branch circuit extending from bus 12 through ignitron 19, common capacitor 16 and ignitron 20 to bus 15; a plurality of normally inoperative triggering circuit means, one for each ignitron tube, each comprising a transformer secondary 21 of a suitable transformer 22 energized from an alternating current source 22', a rectifier 23 in series therewith and a condenser 24 across the secondary 21, the terminals of each condenser 24 being connected with the triggering or firing terminals of the corresponding tubes 17, 18, 19 or 20 through a normally open circuit having a normally open periodically closable switch, each designated by a prime number corresponding to its tube, e. g. 17', 18', 19' or 20'; and a cam operated mechanism 25 for periodically and alternately closing the switches of the triggering means of both tubes in one branch and then in the other of said branches.

In explaining the operation of the foregoing circuit arrangement as it appears in Fig. 5, we assume that the capacitor 16 is fully charged in a direction such as to have its negative side on the left so as to condition the branch containing ignitrons 17 and 18 for circuit operation therethrough and to block the other branch against such operation. By conditioning, I mean that the charge of the capacitor 16 is of such polarity that it will allow a current flow in the conditioned branch circuit to charge capacitor 16 in an opposite direction, but it will oppose a current flow through the unconditioned branch circuit. Now, if we close the triggering circuits of the other unconditioned branch so as to trigger the ignitrons 19 and 20 and to thereby render them conductive, nothing happens because the capacitor 16 is fully charged in a direction opposing any flow of current from the energy source. On the other hand, when the cam 25 closes switches 17' and 18' as shown in Fig. 5, it will trigger the ignitrons 17 and 18 of the one branch which is conditioned for operation by capacitor 16.

As a consequence, the voltage across capacitor 11 is added to the voltage of capacitor 16 and the sum total thereof becomes effective to discharge a current impulse through the water between the electrodes 1 and 2. The magnitude of this current impulse is, of course, a matter of voltage over impedance. Although both capacitors 11 and 16 will discharge at identical current rates, capacitor 16, being much smaller than capacitor 11, will be discharged earlier. When capacitor 16 is fully discharged, it will start to charge in the opposite direction; hence, capacitor 11 will continue to discharge in the same direction until capacitor 16 becomes fully charged in the opposite direction so as to place its positive side on the left and its negative side on the right. The quantity of current thus discharged through the water is equal to twice the capacity of the smaller capacitor 16 while the time over which the discharge takes place is equal to the time required to discharge and charge capacitor 16. The discharge and charge of capacitor 16 may be termed charging it from one direction of polarity to the opposite direction of polarity. When the capacitor 16 becomes fully charged in the opposite direction, it blocks the branch containing ignitrons 17 and 18 against further operation and conditions the branch containing ignitrons 19 and 20 for the next firing operation.

Thus, the periodic alternate triggering of the ignitrons of each branch circuit successively charges the capacitor 16 in a reverse direction with each charging current impulse being discharged between the fishing electrodes 1 and 2. This circuit is substantially the same circuit disclosed in my earlier copending application, Serial No. 525,933, when issued on Oct. 2, 1956 as Patent No. 2,764,832.

The power supply means of Fig. 5 is designed initially to provide impulses of large peak voltage. The control means, which renders the power supply means subsequently operative to energize the electrodes with impulses of progressively reduced voltage extending from said high peak voltage to a relatively low peak voltage, includes an energy-storing flywheel 28 which is driven by the same diesel engine prime mover 27 that also drives the generator 10. The field winding 29 of the generator 10 is excited from a separate source through a switch 30 which is also ganged to operate with a switch 31 controlling the energization of the transformer 22 from the alternating current source 22′. An additional field winding 32 is inserted in series between the negative terminal of the generator 10 and the fishing electrode 2 to provide the generator 10 with additional field excitation during each period of load.

The generator 10 and the diesel engine 27 are selected to provide the impulse generation circuit, under continuous duty conditions, with only enough electrical energy to cause it to produce an impulse of a desired minimum peak voltage value. However, the generator 10 and the engine 27, under no load conditions, can be driven to a substantial speed above the normal continuous load speed after which time it can be loaded and will initially provide the impulse generation circuit with enough electrical energy to cause the impulse generation circuit to produce an impulse having a much larger peak voltage value.

Immediately prior to electro-fishing, the generator 10 is driven to a substantial speed above normal speed. At the start of electro-fishing, the generator 10 is loaded by the simultaneous closing the switches 30 and 31. Now, due to the excess energy stored in the overspeeding flywheel 28 and the additional excitation provided by the field 32, the generator 10 will initially provide an abnormally large amount of electrical energy. This overload, however, immediately starts to pull down the speed of the generator in a progressive manner; hence it supplies a progressively reduced amount of electrical energy until the speed of the generator 10 reaches a predetermined value, which may be its normal continuous-duty speed or a lower speed. Thereafter the energy delivered by the generator to the impulse generation circuit will be at a desired minimum value.

Figure 7:
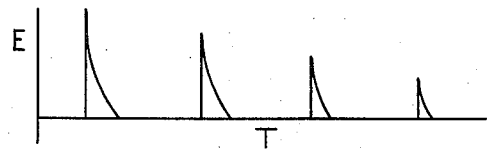
Fig. 7 is a voltage-time diagram illustrating relative shapes of the impulses discharged at successive stages of electro-fishing by the apparatus of either Figures 5 or 6.

As the generator 10 initially provides the impulse generation circuit with an initially high voltage and thereafter delivers a progressively reduced voltage thereto, the capacitors 11 and 16 of the impulse circuit will initially be charged periodically with the initially delivered high voltage and thereafter, will be charged with a progressively decreased voltage in accordance with the progressively reduced voltage delivered by the generator 10. As a result, the impulses delivered to the fishing electrodes 1 and 2 will initially be of a high peak voltage value and thereafter will be of a progressively reduced peak voltage value until the generator 10 and engine 27 reach their desired low speed after which time the peak voltage values of the impulses delivered to the fishing electrodes 1 and 2 will be maintained at a uniform minimum value. The relative sizes and shapes of the impulses delivered to the fishing electrodes 1 and 2 at successive stages of an electro-fishing operation by the apparatus of Fig. 5 are illustrated in Fig. 7 in which "E" indicates voltage and "T" indicates time.

Figure 6:
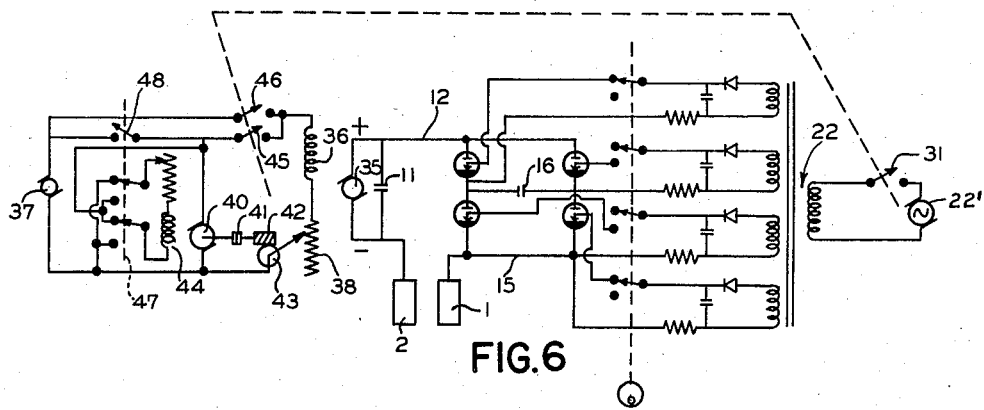
Fig. 6 is a diagram of another embodiment of an apparatus for practicing my improved method.

The embodiment of Fig. 6 includes the same impulse generation circuit shown in Fig. 5 with the exception that the generator 10 and associated prime mover 27 is replaced with a generating unit 35 having a rating selected normally to provide enough electrical energy to the impulse creation circuit to cause it to create a fishing impulse of the maximum size desired.

The field winding 36 of the generator 35 is energized from a suitable independent source 37. The control means of Fig. 6 includes an adjustable resistor or rheostat 38 connected in series between the source 37 and the field 36. A mechanical arrangement is provided to adjust the resistance of the resistor 38 in a desired progressive manner. It consists of a motor 40 driving a slip clutch 41, a worm 42 and a worm gear 43 which is connected to move the adjustable contact of the resistor 38.

For movement in a direction to increase the resistance of the resistor 38 progressively, the motor 40 and its field winding 44 is energized from the source 37 through a switch 45 and a switch 46. When the worm gear 43 has adjusted the resistor 38 for maximum resistance, the motor 40 continues driving until the switch 46 is opened, but the slip clutch begins slipping thereby allowing the worm gear 43 to remain stationary.

A reversing switch 47 is interconnected between the field winding 44 of motor 40 and the source 37 so that the polarity of the field 44 may be reversed to run the motor 40 backwards. An auxiliary switch 48 is connected between the source 37 and the motor 40 and its field winding 44. The switch 48 is ganged with the field reversing switch 47 so that when the switch 47 is switched to reverse the motor, the switch 48 will be closed. Therefore, after the electro-fishing operation is completed and the switches 45 and 46 are opened, the switch 47 is moved to its alternate position and the switch 48 is closed to move the adjustable resistor 38 back to zero position for the start of another electro-fishing operation. An adjustable resistor is connected in series with the field 44 of the motor 40 so that its speed may be adjusted to change the time interval between the adjustment of the resistor from maximum to maximum resistance.

Prior to the start of electro-fishing, the switches 45 and 46, ganged to operate with the switch 31 of the transformer 22, will be open, the generator unit 35 will be operating at normal speed under no-load and the resistor 38 will be adjusted to a minimum resistance. To begin electro-fishing, the switches 45, 46 and 31 are closed and the generator 35 initially provides a maximum amount of electrical energy to the impulse generation circuit as the current in the field winding 36 is at a maximum value. However, as fishing continues the motor 40 will progressively adjust the adjustable resistor 38 to introduce resistance into the exciting field winding 36 of the generator 35 thereby causing the generator to deliver a progressively reduced voltage to the impulse generation circuit.

As a result of this progressively reduced voltage supplied to the impulse generation cicuit, the capacitors 11 and 16 will initially be charged to a maximum voltage, but as fishing continues, the capacitors will be charged to a progressively reduced value. This progressive reduction of the impulse voltage will continue until adjustable resistor 38 has been moved to offer a maximum resistance to the source 37 energizing the exciting field 36.

Fig. 7 illustrates the relative size and shape of the impulses discharged between the fishing electrodes 1 and 2 by the apparatus of Fig. 6 at successive stages of the electro-fishing operation.

Figure 8:
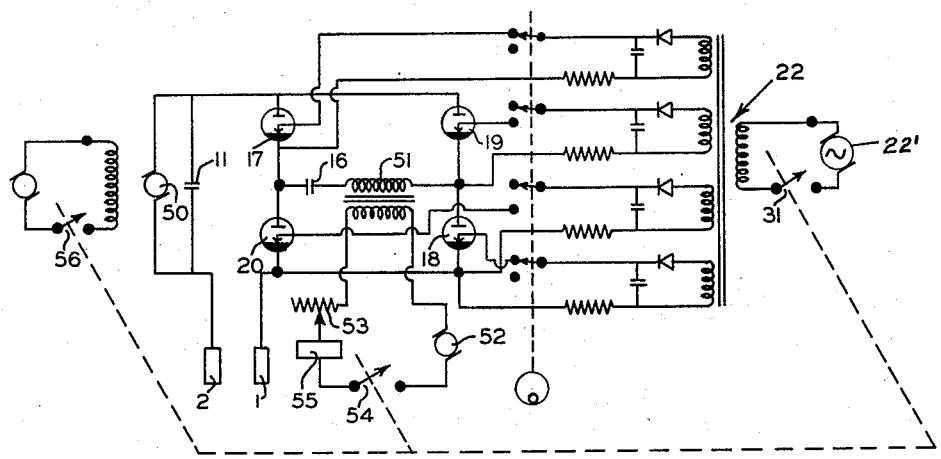
Fig. 8 is a diagram of a third embodiment of an apparatus for practicing my improved method.

The embodiment of Fig. 8 includes the same impulse generation circuit shown in Fig. 5 with the exception that the generating unit 50 energizing the capacitor 11 has a rating selected to normally provide the necessary voltage to the impulse generation circuit to cause it to produce the maximum voltage impulse desired. The generator 50 includes an excitation field energized from an independent source.

The Fig. 8 control means includes a saturable source reactor 51 having its primary winding connected between one side of the pulsing capacitor 16 and the common connection of ignitrons 18 and 19. The secondary winding of the saturable core reactor 51 is energized from a suitable source 52 through an adjustable resistor 53 and a switch 54. A mechanical arrangement 55, similar to the mechanical arangement shown in Fig. 6 for adjusting the adjustable resistor 38, may be provided to adjust the resistor 53 of Fig. 8 in a progressive manner. A switch 56 is provided in the excitation field winding circuit of the generator 50 and is ganged to operate with the switch 54 and the switch 31 of the triggering transformer 22.

Prior to the start of electro-fishing with the embodiment of Fig. 8, the switches 31, 54 and 56 are open, the resistor 53 is in a minimum resistance position whereby the full current from source 52 may flow through the secondary winding of the reactor 51 when the switch 54 is closed and the generator 50 is being driven at normal speed under no-load.

At the start of electro-fishing, the switches 31, 54 and 56 are simultaneously closed thereby causing the generator to supply a maximum amount of electrical energy to the impulse generation circuit and also causing the source 52 to supply a maximum amount of current to the secondary winding of the reactor 51. Due to the maximum current flowing in the secondary of the reactor 51, the reactor will be saturated and offer a minimum impedance to the flow of current through its primary winding. As a result the peak voltage of the charging current of the capacitor 16 will be at its maximum value and the impulse discharged between the fishing electrodes 1 and 2 will be of a maximum voltage value.

Figure 9:
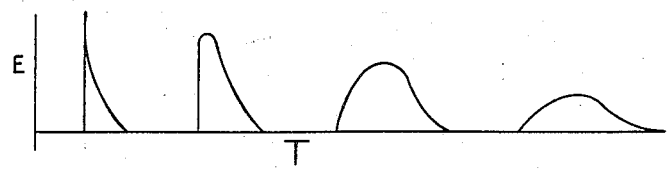
Fig. 9 is a voltage-time diagram illustrating the shape of the impulses discharged at successive stages of electro-fishing by the apparatus of Fig. 8.

As fishing continues, the mechanism 55 will progressively adjust the resistor 53 to introduce resistance into the circuit between the source 52 and the secondary of the reactor 51 and the reactor 51 will become progressively less saturated and accordingly offer more inductive impedance to current passing through its primary winding. As the inductive impedance is progressively increased in the primary winding of the reactor 51, the peak voltage of the charging current of the capacitor 16 will progressively decrease and the time interval of the charging of the capacitor 16 will become progressively longer as shown in Fig. 9. When the resistor 53 has been adjusted to offer its maximum resistance, the peak voltage of the charging current of the capacitor 16 will be of a minimum value.

Fig. 9 illustrates the relative sizes and shapes of the impulses discharged between the fishing electrodes 1 and 2 by the embodiment of Fig. 8 at successive stages of an electro-fishing operation. Here again, "E" and "T" indicate voltage and time.

Figure 10:
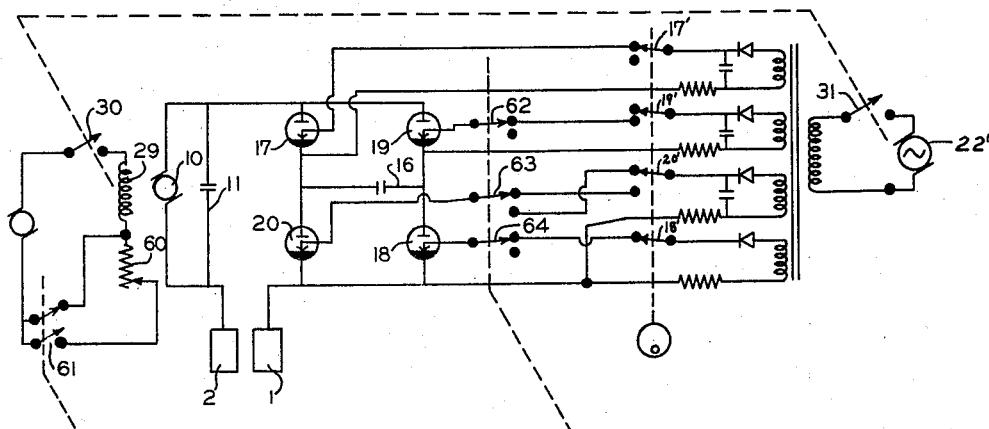
Fig. 10 is a diagram of a fourth embodiment of an apparatus for practicing my improved method by shifting from an impulse current discharge to a steady direct current discharge during the final stage of electro-fishing.

In accordance with a further and important feature of my invention, an impulse current of reduced peak voltage may be followed or replaced by a steady or sustained direct current of a value sufficient to hold the fish during the collection period. One circuit embodiment for enabling this to be done is shown in Fig. 10, which is a modification of Fig. 5. In the circuit arrangement of Fig. 10, an adjustable resistor 60 is connected in series with the exciting field winding 29 of the generator 10. A double throw switch 61 is mounted so that, in one position, the field 29 will be connected directly to its source and, in the other position, the field 29 will be connected in series with its source through the adjustable resistor 60.

Additional switches 62, 63 and 64 are connected in series between the triggering electrodes of the ignitrons 19, 20 and 18, respectively, and their corresponding triggering switches 19', 20' and 18'. The switches 62 and 64 are adapted, when open, to open the triggering circuits of ignitrons 19 and 18 but the switch 63 is a two position switch and is adapted, when moved to its alternate position, to connect the triggering circuit of the ignitron 20 to cause it to fire at the same period that the ignitron 17 fires.

Thus when the switch 63 is moved to its alternate position, the pulsing capacitor 16 is removed from the firing circuit of capacitor 11 and capacitor 11 thereupon directly discharges through ignitrons 17 and 20. After the capacitor 11 is discharged as far as generator 10 will permit, then the generator will maintain a direct current flow through the ignitrons 17 and 20 as long as may be desirable or necessary.

The switches 61, 62, 63 and 64 are ganged to be operated together. Fig. 10 illustrates their normal positions for an impulse type discharge to take place between the fishing electrodes 1 and 2, but when they are moved to their alternate positions, the adjustable resistor 60 is cut into the circuit of the exciting field 29, the triggering circuits of the ignitrons 19 and 18 are opened, and the ignitron 20 is fired at the same time as ignitron 17. Thus a continuous discharge of current will take place between the fishing electrodes 1 and 2. The resistor 60 can be adjusted to control the value of the continuous current discharged between the fishing electrodes 1 and 2.

Figure 11:
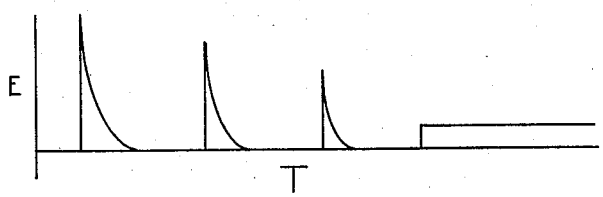
Fig. 11 is a voltage-time diagram illustrating the discharge current shape at successive stages of electro-fishing by the apparatus of Fig. 10.

Although the continuous current discharge circuit of Fig. 10 is illustrated as a modification of Fig. 5, the embodiments of Figs. 6 and 8 can also be modified accordingly. The relative sizes and shapes of current discharged between the fishing electrodes 1 and 2 at successive stages during an electro-fishing operation is illustrated in Fig. 11 in which "E" and "T" indicate voltage and time. An initially large impulse is shown on the left and thereafter a successively reduced impulse until the reduction of the impulse to a minimum value, after which time the switches 61 to 64 are moved to an alternate position and a continuous discharge of current takes place between the fish electrodes for creation of a fishing holding field having a relatively small size.

Having described my invention I claim:

1. An improvement in the method of electro-fishing in sea water wherein an electrical impulse is periodically discharged through the fishing waters connecting spaced electrodes immersed in the waters to induce fish to swim toward one electrode, comprising: initially discharging periodic electro-fishing current impulses, having a predetermined peak voltage, through the fishing waters to cause fish in the waters to start swimming toward the one electrode; and thereafter discharging an electro-fishing current of relatively reduced voltage.

2. The method of claim 1 wherein: said thereafter discharging step is performed by discharging electro-fishing current impulses which are progressively reduced in peak voltage from a high value to a relatively low value.

3. The method of claim 1 including: changing the electro-fishing current to cause a sustained direct current to flow during the final stages of electro-fishing.

4. An electro-fishing apparatus comprising: a pair of fishing electrodes; power supply means including an impulse generator electrically connected to said electrodes and operative, at the beginning of the fishing operation, to energize said electrodes initially with periodic current impulses of a high predetermined peak voltage; and control means rendering said power supply means operative, as the fishing operation proceeds after said electrodes have been initially energized, to energize said electrodes with an electro-fishing current of relatively lower voltage.

5. The apparatus of claim 4 wherein: said control means renders said power supply means operative to energize said electrodes with periodic current impulses which are progressively reduced from a high peak voltage to a relatively low peak voltage.

6. The apparatus of claim 4 wherein: said control means renders said power supply means operative to supply a relatively sustained direct current during the final stages of the fishing operation.

7. The apparatus of claim 4 wherein: said power supply means includes a source of direct current, a pulsing capacitor arranged between said source and one electrode and switch means operable, when actuated one way, electrically to connect the opposite terminals of the pulsing capacitor respectively to said source and said one electrode for one firing operation and, when actuated another way, to reverse said terminal connections for the next firing operation.

8. The apparatus of claim 7 wherein: said control means operates to effect the connection of said direct current source directly across said fishing electrodes to provide, between said electrodes, a sustained flow of direct current of said relatively lower voltage for forming a relatively small fish holding area during the final stages of the fishing operation without killing the fish within the area.

9. The apparatus of claim 7 wherein: said power supply and control means include a prime-mover driven, flywheel-controlled, generator unit which, at the beginning of the electro-fishing operation, operates at an excessively high rate of speed causing said generator to produce a correspondingly high electro-fishing voltage and current, and, as the electro-fishing operation proceeds, operates at a progressively reducing rate of speed, extending from said high speed to a relatively low speed causing said generator to produce a corresponding reduction in the electro-fishing voltage and current.

10. The apparatus of claim 7 wherein said power supply and control means include: a direct current generator having an exciting field circuit; an adjustable resistor for controlling the flow of current in said field circuit; and means for progressively adjusting said resistor, as the electro-fishing operation proceeds, to effect a progressive reduction in the voltage output of said generator.

11. The apparatus of claim 7 wherein said control means includes: an adjustable saturable core reactor connected in series with said capacitor between said direct current source and said one electrode; and means for progressively changing the inductive reactance of said reactor from a low value, at the start of the electro-fishing operation, progressively to a higher value, as the electro-fishing operation proceeds, to effect a progressive reduction in the voltage of said impulses.

References Cited in the file of this patent
UNITED STATES PATENTS

| | | |
|---|---|---|
| 2,605,742 | Burkey | Aug. 5, 1952 |
| 2,792,659 | Kreutzer | May 21, 1957 |

FOREIGN PATENTS

| | | |
|---|---|---|
| 176,096 | Great Britain | Feb. 27, 1922 |